United States Patent [19]
Kami et al.

[11] Patent Number: 5,507,510
[45] Date of Patent: Apr. 16, 1996

[54] MULTI-LINK TYPE SUSPENSION SYSTEM

[75] Inventors: Yozo Kami; Yasunori Oku; Kosei Mizumoto; Kiyoshi Nakajima, all of Wako, Japan

[73] Assignee: Honda Giken Kogyo Kabushiki Kaisha, Tokyo, Japan

[21] Appl. No.: 208,266

[22] Filed: Mar. 10, 1994

[30] Foreign Application Priority Data

Mar. 26, 1993 [JP] Japan ................................ 5-068169
Dec. 27, 1993 [JP] Japan ................................ 5-331598

[51] Int. Cl.$^6$ .................................................. B60G 7/00
[52] U.S. Cl. ........................ 280/96.1; 280/675; 280/691
[58] Field of Search ............................. 290/96.1, 673, 290/675, 691, 690, 688, 660

[56] References Cited

U.S. PATENT DOCUMENTS

| | | | |
|---|---|---|---|
| 4,444,415 | 4/1984 | von der Ohe ........................ | 280/701 |
| 4,462,609 | 7/1984 | von der Ohe ........................ | 280/690 |
| 4,705,292 | 11/1987 | Hespelt et al. ........................ | 280/660 |
| 4,765,647 | 8/1988 | Kondo et al. ........................ | 280/701 |
| 4,878,688 | 11/1989 | Kubo ........................ | 280/693 |
| 4,941,677 | 7/1990 | Matsumoto et al. ........................ | 280/690 |
| 5,048,860 | 9/1991 | Kanai et al. ........................ | 280/675 X |
| 5,100,165 | 3/1992 | Hespelt ........................ | 280/675 |
| 5,116,076 | 5/1992 | Moll ........................ | 280/691 |

FOREIGN PATENT DOCUMENTS

| | | |
|---|---|---|
| 0340541 | 4/1989 | European Pat. Off. . |
| 3048755A1 | 7/1982 | Germany . |
| 3048794C1 | 8/1982 | Germany . |
| 770095 | 5/1955 | United Kingdom . |
| 2091175 | 12/1981 | United Kingdom . |
| 2221433 | 2/1990 | United Kingdom . |
| 2243348 | 10/1991 | United Kingdom . |
| 2016386 | 10/1992 | WIPO ........................ 280/675 |

OTHER PUBLICATIONS

Fehrwerktechnik: Radaufhangungen 1986 (J. Reimpell).
Chassis Technology: Wheel Suspensions pp. 1–7 (Translation of Reference "Fahrwektechnik: Radaufhangungen").

*Primary Examiner*—Christopher P. Ellis
*Attorney, Agent, or Firm*—Armstrong, Westerman, Hattori, McLeland & Naughton

[57] ABSTRACT

A multi-link type suspension system includes a knuckle for rotatably supporting an axle, an upper arm extending laterally of the vehicle body to connect the knuckle with the vehicle body above the axle, a leading arm extending outwardly and forwardly of the vehicle body from a rear inside position of the vehicle body to connect the knuckle with the vehicle body above the axle, a lower arm extending laterally of the vehicle body to connect the knuckle with the vehicle body below the axle, a trailing arm extending outwardly and rearwardly of the vehicle body from a front inside position of the vehicle body to connect the knuckle with the vehicle body below the axle, and a control arm extending laterally of the vehicle body to connect the knuckle with the vehicle body in rear of the axle. The longitudinal distance from an outer end of the control arm to an outer end of the leading arm is set larger than a longitudinal distance from an outer end of the upper arm to the outer end of the leading arm, and a longitudinal distance from the outer end of the control arm to an outer end of the trailing arm is set larger than a longitudinal distance from an outer end of the lower arm to the outer end of the trailing arm. Thus, it is possible to produce a toe-in during braking to enhance the steering stability.

8 Claims, 12 Drawing Sheets

MULTI-LINK TYPE SUSPENSION SYSTEM

BACKGROUND OF THE INVENTION

1. Field of the Invention

The present invention relates to a multi-link type suspension system including a knuckle for rotatably supporting an axle, five arms for connecting the knuckle to a vehicle body for vertical movement, and a damper for buffering the vertical movement of the knuckle.

2. Description of the Prior Art

Such a multi-link type suspension system has been already known as disclosed in Japanese Patent Application Laid-open No. 134309/82.

As shown in FIG. 12, the above multi-link type suspension system includes an upper arm UP and an upper trailing arm UTR for connecting a knuckle N with a vehicle body B above an axle A, as well as a lower arm LO and a lower trailing arm LTR for connecting the knuckle N with the vehicle body B below the axle A, and a control arm CO for connecting the knuckle N with the vehicle body B in front of the axle A.

In general, in suspension systems, it is desirable for purpose of enhancing the steering stability to have a tendency of a toe-in, i.e., a tendency for a front end of the wheel to be offset inwardly of the vehicle body during braking. However, the prior art multi-link type suspension system suffers from a problem that a proper toe-in cannot be produced by a braking force.

More specifically, in the prior art multi-link type suspension system, as shown in FIG. 13A, a portion of the knuckle N above the axle A, i.e., outer ends of the upper arm UP and the upper trailing arm UTR are swung in a direction indicated by c' about an outer end of the control arm CO to produce a toe-in tendency. In addition, as shown in FIG. 13B, a portion of the knuckle N below the axle A, i.e., outer ends of the lower arm LO and the lower trailing arm LTR are swung in a direction indicated by f' about the outer end of the-control arm CO to produce a toeing-out tendency. Therefore, a reverse force is applied to the portions of the knuckle N above and below the axle A, whereby the rear wheel W cannot be properly toed-in with braking.

SUMMARY OF THE INVENTION

Accordingly, it is an object of the present invention to provide a multi-link type suspension system wherein a toe-in can be produced by a braking force to enhance steering stability.

To achieve the above object, according to a first aspect and feature of the present invention, there is provided a multi-link type suspension system comprising a knuckle for rotatably supporting an axle, five arms for connecting the knuckle to a vehicle body for vertical movement, and a damper for buffering the vertical movement of the knuckle, the five arms comprising an upper arm extending laterally of the vehicle body to connect the knuckle with the vehicle body above the axle, a leading arm extending outwardly and forwardly of the vehicle body from a rear inside position of the vehicle body to connect the knuckle with the vehicle body above the axle, a lower arm extending laterally of the vehicle body to connect the knuckle with the vehicle body below the axle, a trailing arm extending outwardly and rearwardly of the vehicle body from a front inside position of the vehicle body to connect the knuckle with the vehicle body below the axle, and a control arm extending laterally of the vehicle body to connect the knuckle with the vehicle body in rear of the axle, a longitudinal distance from an outer end of the control arm to an outer end of the leading arm being set larger than a longitudinal distance from an outer end of the upper arm to the outer end of the leading arm, and a longitudinal distance from the outer end of the control arm to an outer end of the trailing arm being set larger than a longitudinal distance from an outer end of the lower arm to the outer end of the trailing arm.

With the above construction, due to the load applied to the knuckle during braking, both of the portion of the knuckle above the axle to which the outer ends of the upper arm and the leading arm are connected and the portion of the knuckle below the axle to which the outer ends of the lower arm and the trailing arm are connected, are offset together inwardly of the vehicle body, thereby producing a toe-in about the outer end of the control arm connected to the portion of the knuckle in rear of the axle. Therefore, it is possible to enhance the steering stability during braking.

In addition to the construction according to the first aspect, a resilient bushing may be provided at least at one of a connection of the leading arm with the knuckle and a connection of the leading arm with the vehicle body, and may have a modulus of elasticity which is high in a direction of tension of the leading arm and low in a direction of compression of the leading arm. With such construction, even if a tension load is applied to the leading arm by application of a moment to the knuckle during braking, the turning of the knuckle can be prevented by the high modulus of elasticity of the resilient bushing, thereby providing a high caster rigidity to enhance the steering stability. In addition, when a compression load is applied to the leading arm by application of a longitudinal force from an uneven portion of a road surface to the knuckle, the rearward movement of the knuckle can be permitted by the low modulus of elasticity of the resilient bushing, thereby providing a high compliance to enhance the riding comfort.

Further, if a supported point of the damper on the vehicle body is offset more rearwardly of the vehicle body than a supported point thereof on the knuckle, the damper is prevented from being expanded and contracted, even if the knuckle is moved downwardly of the vehicle body by application of the longitudinal force. This makes it possible to prevent the generation of a damping force due to an unnecessary expansion or contraction of the damper to further enhance the riding comfort.

Yet further, according to a second aspect and feature of the present invention, there is provided a multi-link type suspension system comprising a knuckle for rotatably supporting an axle, five arms for connecting the knuckle to a vehicle body for vertical movement, and a damper for buffering the vertical movement of the knuckle, the five arms comprising an upper arm extending laterally of the vehicle body to connect the knuckle with the vehicle body above the axle, a trailing arm extending outwardly and rearwardly of the vehicle body from a front inside of the vehicle body to connect the knuckle with the vehicle body above the axle, a lower arm extending laterally of the vehicle body to connect the knuckle with the vehicle body below the axle, a leading arm extending outwardly and forwardly of the vehicle body from a rear inside of the vehicle body to connect the knuckle with the vehicle body below the axle, and a control arm extending laterally of the vehicle body to connect the knuckle with the vehicle body in front of the axle, a longitudinal distance from an outer end of the control arm to an outer end of the trailing arm being set larger than a longitudinal distance from an outer end of the upper arm to the outer end of the trailing arm, and a longitudinal distance from the outer end of the control arm to an outer end of the leading arm being set larger than a longitudinal distance from the outer end of the control arm to the outer end of the leading arm.

With the above construction, both of the portion of the knuckle above the axle to which the outer ends of the upper arm and the trailing arm are connected and the portion of the knuckle below the axle to which the outer ends of the lower arm and the leading arm are connected, are offset together outwardly of the vehicle body, thereby producing a toe-in about the outer end of the control arm connected to the portion of the knuckle in front of the axle. Therefore, it is possible to enhance the steering stability during braking.

Yet further, according to a third aspect and feature of the present invention, there is provided a multi-link type suspension system comprising a knuckle for rotatably supporting an axle, a first suspension mechanism comprising a pair of arms which support a longitudinal force of the knuckle above the axle and define a point above a king pin axis of a wheel, a second suspension mechanism comprising a pair of arms which support a longitudinal force of the knuckle below the axle and define a point below the king pin axis of the wheel, and a control arm extending laterally of the vehicle body to connect the vehicle body and the knuckle, the knuckle being provided with a mounting portion extending rearwardly from the knuckle to rotatably connect an outer end of the control arm in order to convert a longitudinal force applied to the first suspension mechanism and a longitudinal force applied to the second suspension mechanism into a force for offsetting the knuckle inwardly of the vehicle body during braking of the wheel.

With the above construction, during braking of the wheel, a force applied to the knuckle by a reaction of the rotating wheel is converted into a force for offsetting the knuckle inwardly of the vehicle body by the first and second suspension mechanism. This makes it possible to produce a toe-in about an outer end of the knuckle and thus to enhance the steering stability during braking.

The above and other objects, features and advantages of the invention will become apparent from the following description of preferred embodiments, taken in conjunction with the accompanying drawings.

BRIEF DESCRIPTION OF THE DRAWINGS

FIGS. 1 to 10 illustrate a first embodiment of a multi-link type suspension system according to the present invention, wherein FIG. 1 is a plan view of the multi-link type suspension system;

FIG. 2 is a rear view of the suspension system of FIG. 1 taken along an arrow 2 in FIG. 1;

FIG. 3 is a side view of the suspension system of FIGS. 1 and 2 taken along a line 3—3 in FIG. 1;

FIG. 4 is a perspective view of the multi-link type suspension system of FIGS. 1–4;

FIG. 5 is an enlarged view of the leading arm of FIGS. 1–3;

FIG. 6 is a sectional view of the leading arm of FIGS. 1–3, taken along a line 6—6 in FIG. 5;

FIG. 7 is a graph illustrating the relationship between the load and the stroke for a rubber bushing joint;

FIGS. 8A to 10 are diagrams for explaining the operation of the suspension system of FIGS. 1–7;

FIGS. 12 and 13 illustrate a prior art multi-link type suspension system, wherein FIG. 12 is a plan view of the prior art multi-ling type suspension system.

DESCRIPTION OF THE PREFERRED EMBODIMENTS

A first embodiment of a multi-link type suspension system according to the present invention will now be described in connection with FIGS. 1 to 5.

Figure 1:
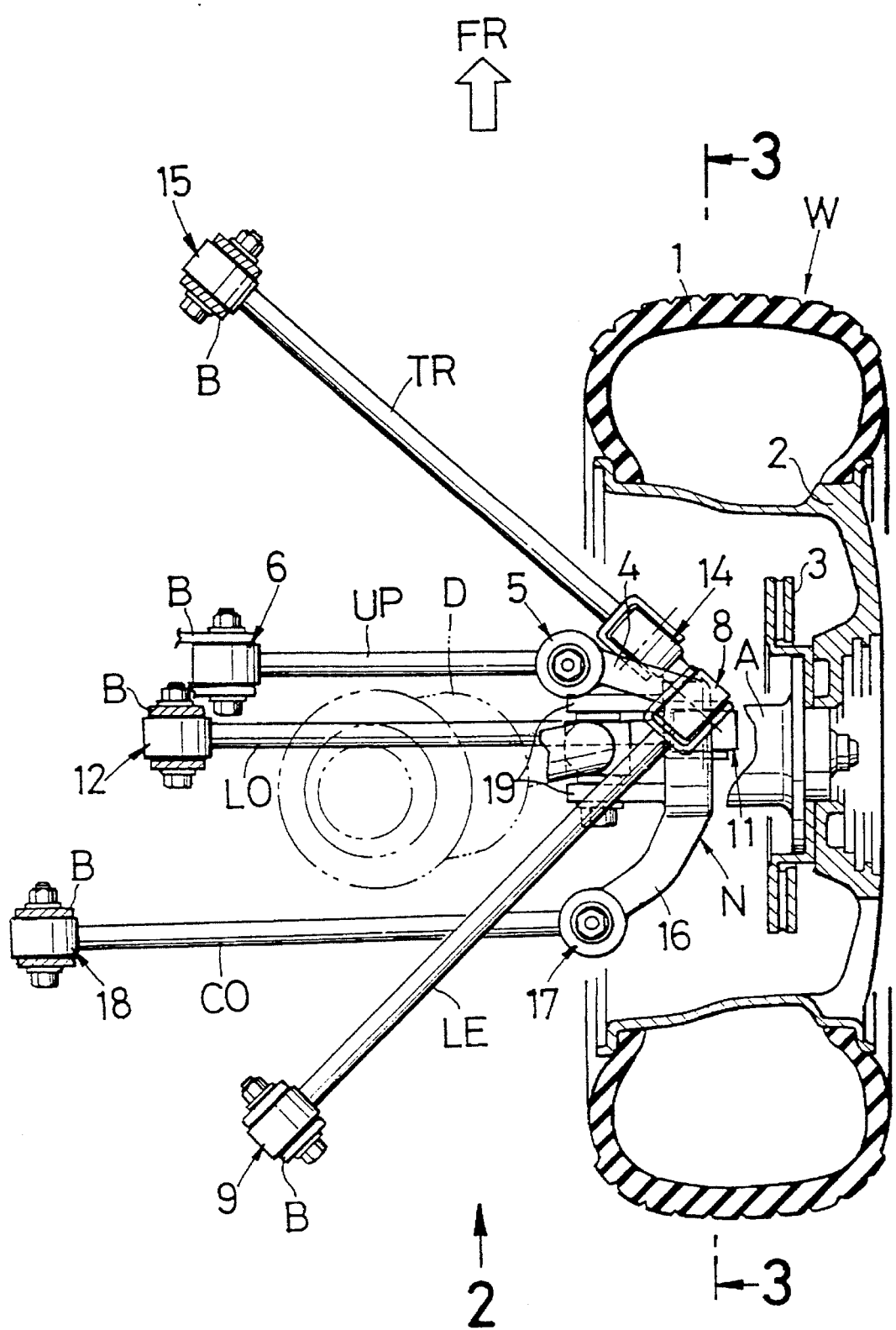
Figure 2:
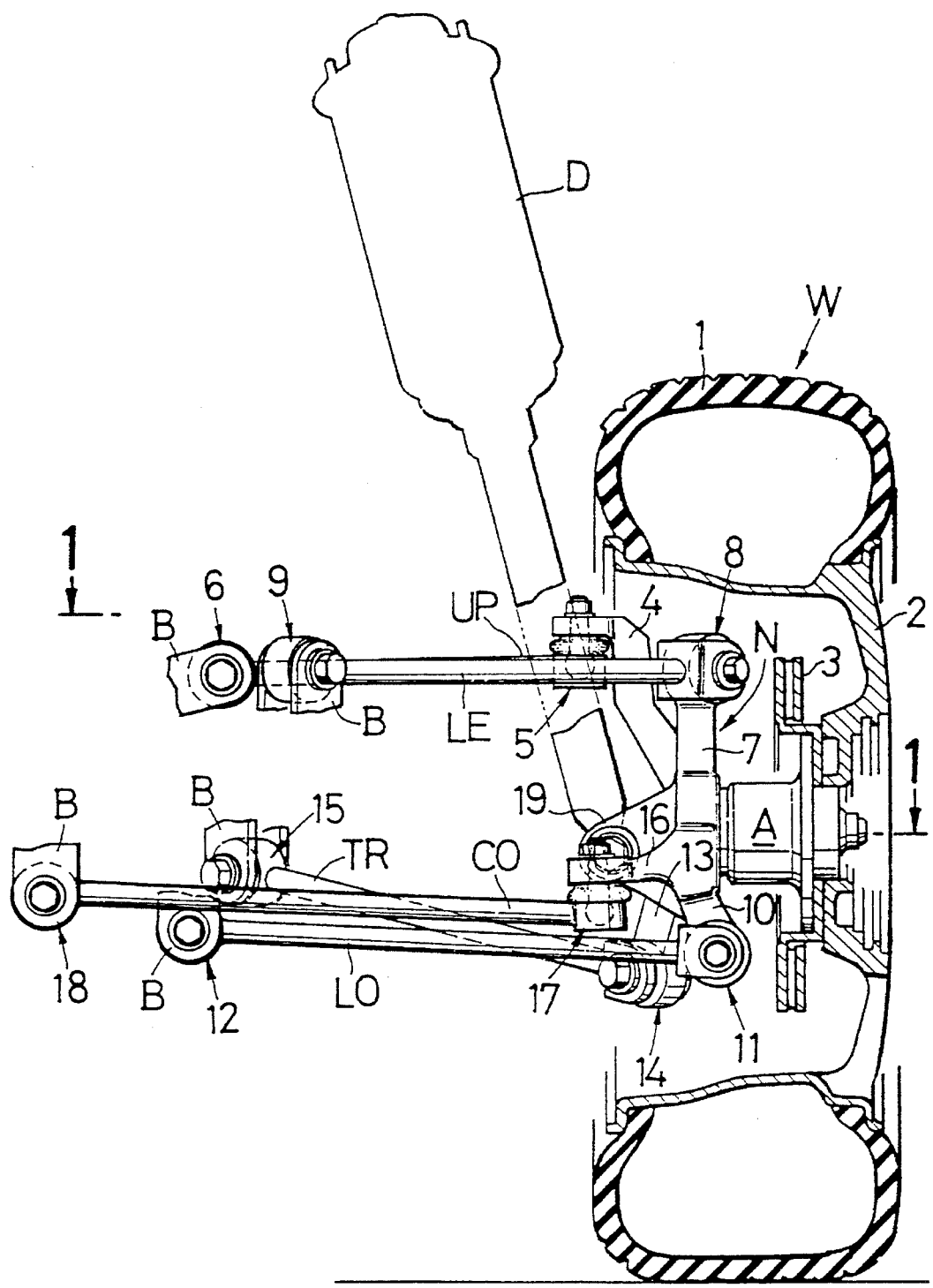
Figure 3:
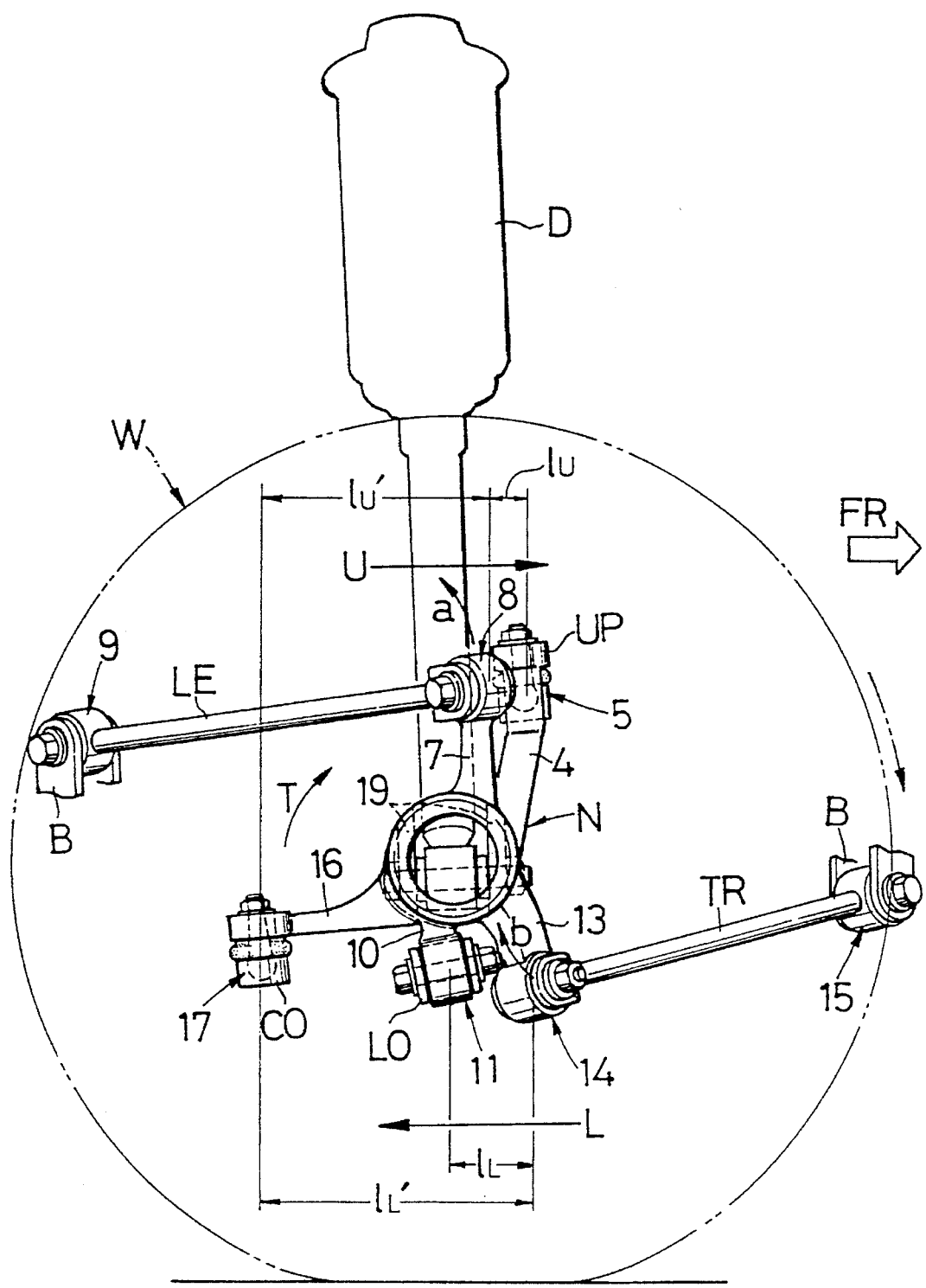

FIGS. 1 to 3 illustrate a suspension system for a right rear wheel W of a front drive vehicle. The rear wheel W includes a tire 1, a wheel body 2 and a brake disk 3 and is rotatably supported on a knuckle N, FIGS. 1 and 2, through an axle A. Outer and inner ends of an upper arm UP are connected to an upper arm mounting portion 4 projecting upwardly from the knuckle N and a vehicle body B through a ball joint 5 and a rubber bushing joint 6, respectively. Outer and inner ends of a leading arm LE are connected to a leading arm mounting portion 7 projecting upwardly from the knuckle N and the vehicle body B through rubber bushing joints 8 and 9, respectively. The upper arm UP and the leading arm LE, FIG. 2, are disposed in the substantially same plane above the axle A. The upper arm UP extends laterally of the vehicle body, and the leading arm LE extends forwardly and outwardly from a rear inside of the vehicle body.

Outer and inner ends of a lower arm LO are connected to a lower arm mounting portion 10, FIGS. 2 and 3, projecting downwardly from the knuckle N and the vehicle body B through rubber bushing joints 11 and 12, respectively. Outer and inner ends of a trailing arm TR are connected to a trailing arm mounting portion 13, FIGS. 2 and 3, projecting downwardly from the knuckle N and the vehicle body B through rubber bushing joints 14 and 15, respectively. The lower arm LO and the trailing arm TR are disposed in the substantially same plane, FIG. 2, below the axle A. The lower arm LO extends laterally of the vehicle body, and the trailing arm TR extends rearwardly and outwardly from a front inside of the vehicle body.

Because the upper arm UP and the lower arm LO are disposed laterally of the vehicle body, as described above, it is possible to effectively receive a load applied from a road surface to the knuckle N in a lateral direction of the vehicle body, and to enhance the caster rigidity and camber rigidity of the rear wheel W.

As can be seen from FIG. 3, a front end of the leading arm LE is in a position slightly higher than a rear end thereof, and a front end of the trailing arm TR is also in a position slightly higher than a rear end thereof, as viewed from the side. Therefore, when the rear wheel W has been stroked upwardly due to an unevenness of a road surface or the like, the rubber bushing joint 8 at the outer end (front end) of the leading arm LE is swung upwardly and rearwardly of the vehicle, as indicated by an arrow a, FIG. 3, and the rubber bushing joint 14 at the outer end (rear end) of the trailing arm TR is swung upwardly and rearwardly of the vehicle, as indicated by an arrow b. As a result, the knuckle N is slightly moved rearwardly of the vehicle body along with the rear wheel W, thereby buffering the shock applied to the rear wheel W from the uneven portion of the road surface.

Outer and inner ends of a control arm CO are connected to a control arm mounting portion 16 projecting rearwardly of the vehicle body from the knuckle N and the vehicle body B through a ball joint 17 and a rubber bushing joint 18, respectively. The control arm CO extends laterally of the vehicle body in the substantially same plane as the lower arm LO and the trailing arm TR.

A lower end of a damper D, FIGS. 2 and 3, is connected to a damper mounting portion 19 projecting inwardly of the vehicle body from the knuckle N. An upper end of the damper D (a mounting portion to the vehicle body B) is supported on the vehicle body B at a location displaced rearwardly of the vehicle body relative to the lower end of the damper D (the mounting portion to the knuckle N). Therefore, an upper portion of the damper D is slightly inclined rearwardly of the vehicle body. The lower end of the damper D is disposed on an extension of an axis of the axle A by utilizing a space defined between the upper arm UP and the leading arm LE. Therefore, it is possible to prevent the generation of a pitching moment due to a load from the road surface, thereby permitting the damper D to be stroked smoothly. Further, because it is not required to support the suspension arms for opposing the pitching moment, it is possible to lower the spring rate of a bushing for the suspension arms to improve riding comfort.

Figure 4:
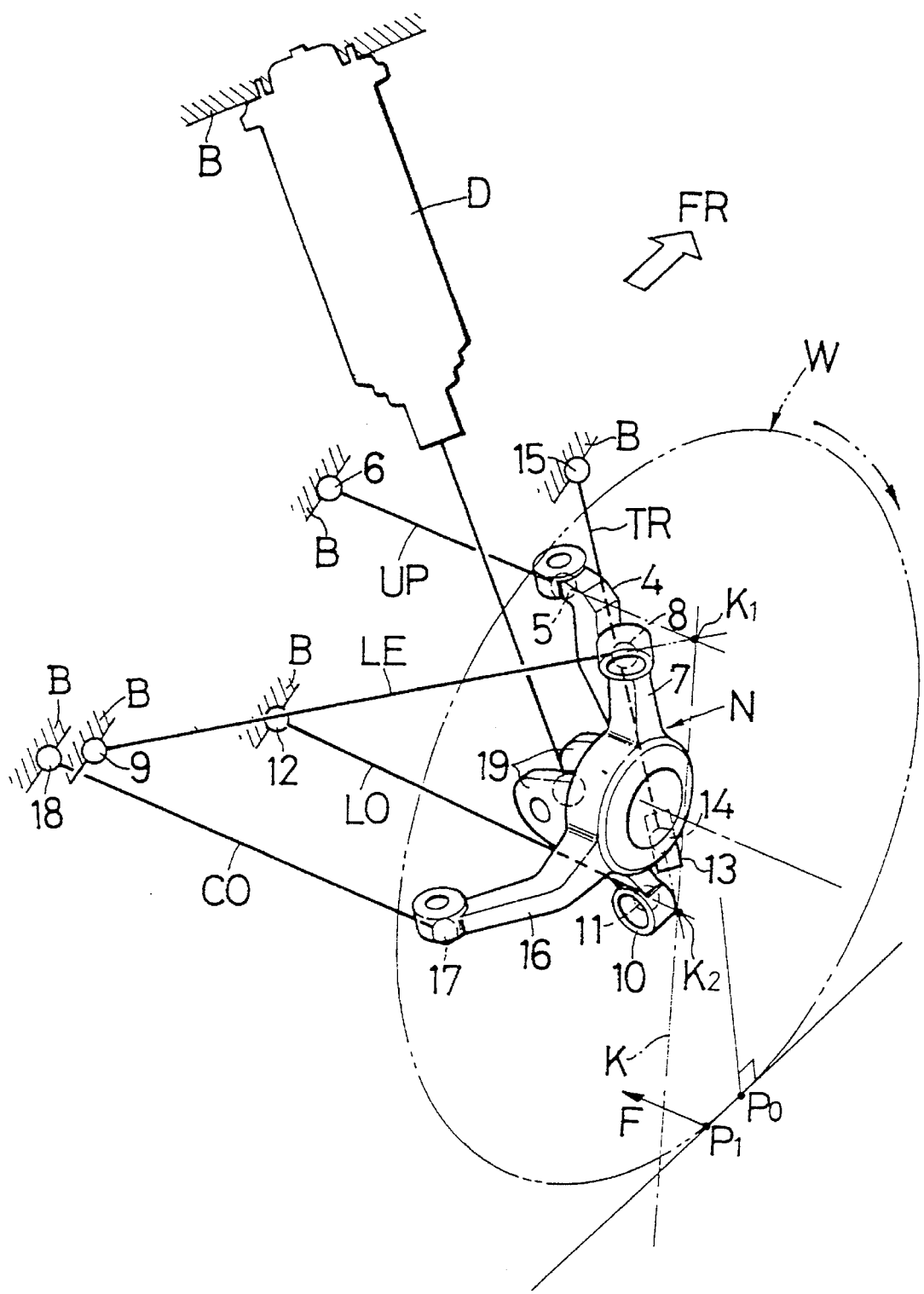

If a braking force is applied to the rear wheel W, the front end of the rear wheel W is offset inwardly of the vehicle body intersection $K_1$, FIG. 4, of extensions of the arm UP and the leading arm LE and an intersection $K_2$ of the extensions of the lower arm LO and the trailing arm TR. This toe-in action, due to the braking, will be described hereinafter.

When the vehicle is at stoppage, the tire 1 is in contact with a road surface at a point $P_0$, FIG. 4, directly below the axle A, but a contact point $P_1$ of the tire 1 during traveling of the vehicle is displaced rearwardly of the vehicle body in response to the traveling speed being increased. The contact point $P_1$ of the tire 1 during such traveling of the vehicle lies in front of the phantom king pin axis K. This makes it possible to steer the rear wheel W inwardly of the turning during turning of the vehicle, thereby improving the turning performance. More specifically, when the vehicle is being turned leftward for example, i.e., in a counterclockwise direction, a centripetal force F (see FIG. 4) directed leftward of the vehicle body which opposes a centrifugal force directed rightwardly of the vehicle body is applied to the contact point $P_1$ of the tire 1 during traveling of the vehicle. The centripetal force F is applied in front of the phantom king pin axis K and hence, the rear wheel W is steered leftwardly, i.e., inwardly of the turning. The steering attendant on the turning of the vehicle is likewise produced for both of left and right wheels W.

A sufficient space can be defined in the wheel body 2 by employing the phantom king pin axis K, thereby easily insuring a space for accommodating the brake disk 3 and a brake caliper which is not shown.

The structure of the rubber bushing joints 8 and 9 for connecting the opposite ends of the leading arm LE to the vehicle body B and the knuckle N will be described below in connection with FIGS. 5 and 6.

The rubber bushing joint 8 located on the leading arm LE adjacent the knuckle N is integrally provided on the leading arm mounting portion 7 of the knuckle N. The rubber bushing joint 8 includes an outer collar 21 formed at a tip end of the leading arm mounting portion 7, a rubber bushing 22 having an anisotropy and fixed to an inner periphery of the outer collar 21 by baking, and an inner collar 23 fixed to an inner periphery of the rubber bushing 22 by baking. The rubber bushing joint 8 is fitted into a bifurcated mounting bracket 24 welded to the front end of the leading arm LE, and is fixed by a bolt 25 which passes through the inner collar 23. The rubber bushing 22 is formed with a first wide clearance $22_1$ at a location remoter from the leading arm LE with the, and a second narrow clearance $22_2$ at a location near the leading arm LE with the inner collar 23 interposed therebetween.

The rubber bushing joint 9, located on the leading arm LE adjacent the vehicle body B, is integrally provided on the leading arm LE. The rubber bushing joint 9 includes an outer collar 26 welded to the rear end of the leading arm LE, a rubber bushing 27, having an anisotropy and fixed to an inner periphery of the outer collar 26 by baking, and an inner collar 28, fixed to an inner periphery of the rubber bushing 27 by baking. The rubber bushing joint 9 is fitted into a bifurcated mounting bracket 29 provided on the vehicle body B, and is fixed by a bolt 30 which passes through the inner collar 28. The rubber bushing 27 is formed with a first wide clearance $27_1$ at a location near the leading arm LE, and a second narrow clearance $27_2$ at a location remoter from the leading arm LE with the inner collar 28 interposed therebetween.

Figure 5:
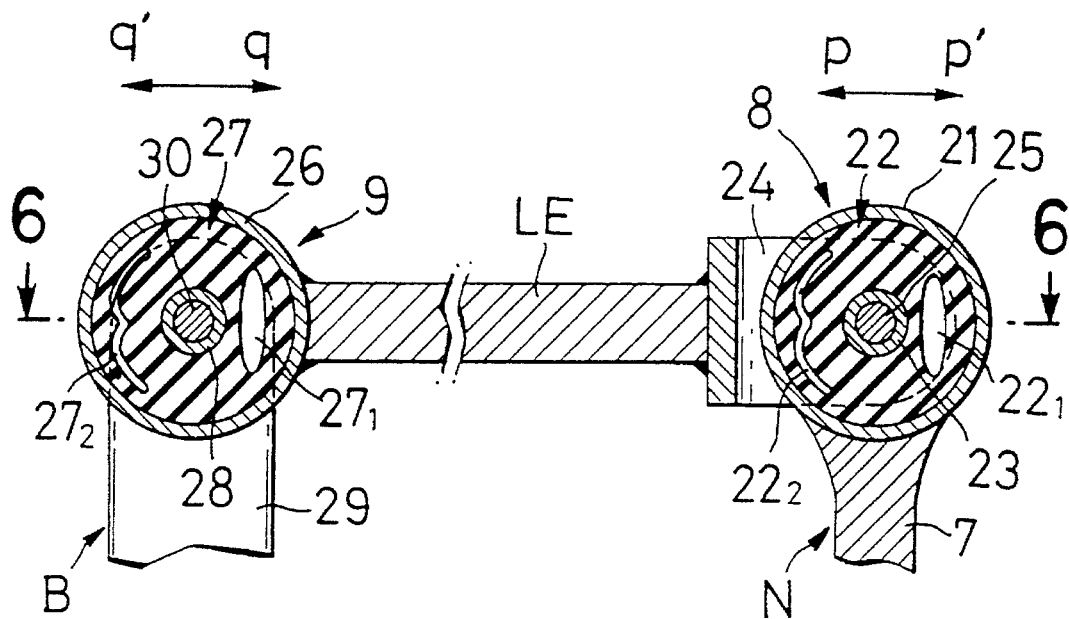
Figure 6:
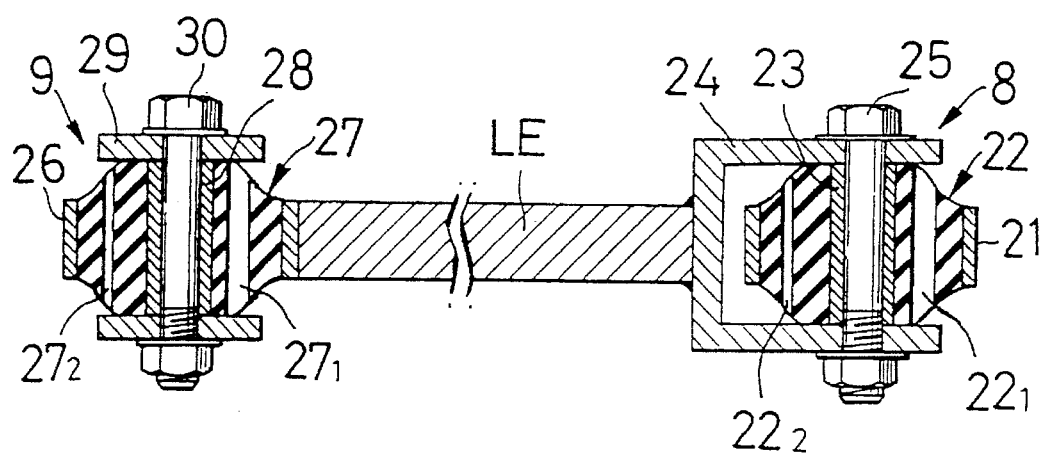

If a compression load is applied to the leading arm LE, the outer collar 21 of the rubber bushing joint 8 is moved in a direction indicated by an arrow p, in FIG. 5, to compress the first clearance $22_1$ of the rubber bushing 22, while at the same time, the inner collar 28 of the rubber bushing joint 9 is moved in a direction indicated by an arrow q, FIG. 5, to compress the first clearance $27_1$ of the rubber bushing 27. At this time, the pair of first clearances $22_1$ and $27_1$ are easily compressed, because they are wide, and the leading arm mounting portion 7 of the knuckle N can be moved rearwardly of the vehicle body (i.e., in the direction of the arrow p) to a relatively large extent.

If a tension load is applied to the leading arm LE, the outer collar 21 of the rubber bushing joint 8 is moved in a direction indicated by an arrow p' in FIG. 5 to compress the second clearance $22_2$ of the rubber bushing 22, while at the same time, the inner collar 28 of the rubber bushing joint 9 is moved in a direction indicated by an arrow q' in FIG. 5 to compress the second clearance $27_2$ of the rubber bushing 27. At this time, because the pair of second clearances $22_2$ and $27_2$ are both narrow, they are immediately squeezed, so that the leading arm mounting portion 7 of the knuckle N is hardly moved forwardly of the vehicle body (i.e., in the direction indicated by the arrow p').

Figure 7:
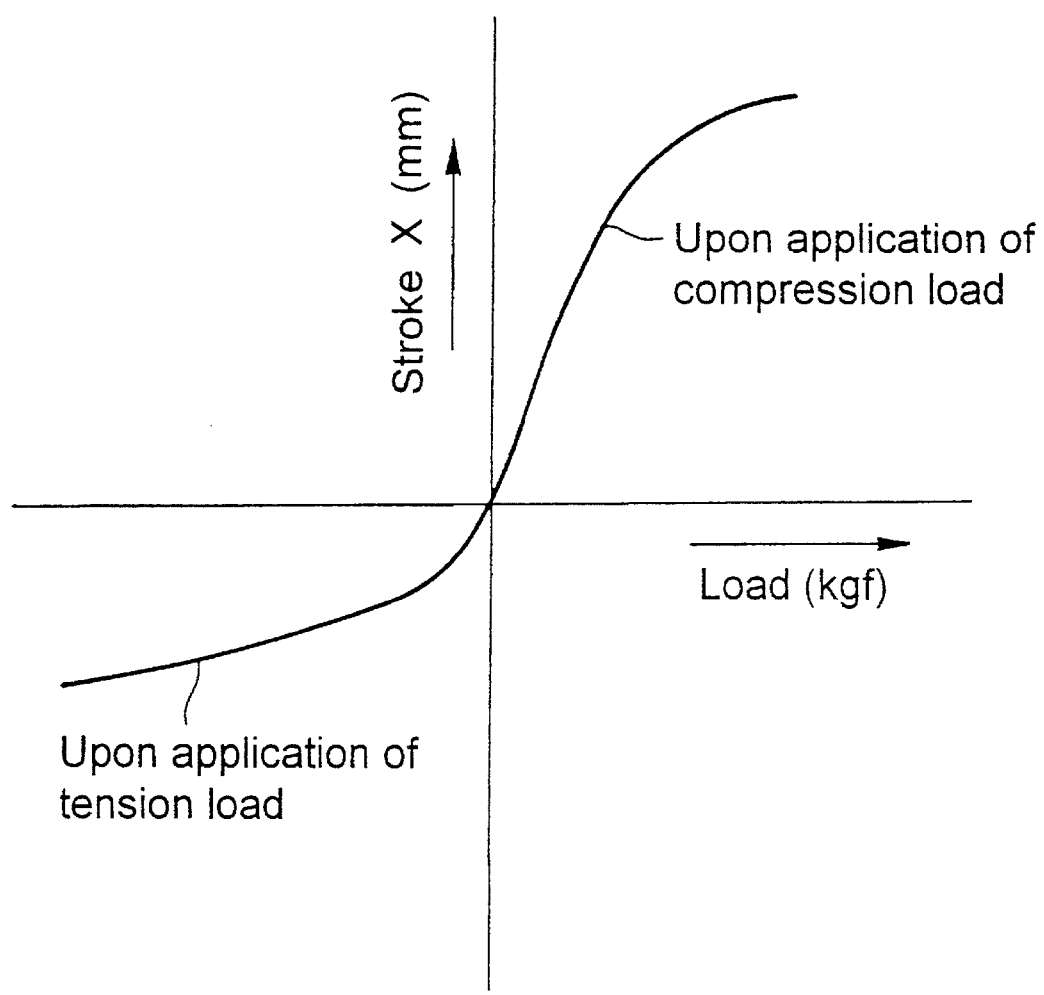

FIG. 7 illustrates the relative stroke X of the outer and inner collars 21 and 23 of the rubber bushing joint 8 when the compression load P is applied to the leading arm LE and when the tension load P is applied to the leading arm LE. It will be appreciated that upon application of the compression load, the stroke is larger (i.e., the modulus of elasticity of the rubber bushing 22 is lower), and upon application of the tension load, the stroke is smaller (i.e., the modulus of elasticity of the rubber bushing 22 is higher). Likewise, the other rubber bushing joint 9 has the same characteristic as in FIG. 7, wherein upon application of the compression load, the modulus of elasticity is smaller, thereby permitting a larger stroke, and upon application of the tension load, the modulus of elasticity is larger, thereby permitting only a smaller stroke.

A suspension system for a left rear wheel W has the substantially same construction as the above-described suspension system for the right rear wheel and hence, the repeated description thereof is omitted. A pair of rubber bushing joints located at opposite ends of trailing arm TR have a high modulus of elasticity, thereby permitting only a small stroke either upon application of a tension load or upon application of a compression load.

The operation of the first embodiment of the present invention, having the above-described construction, will be described below.

When a braking force is applied to the rear wheel W during traveling of the vehicle, the brake caliper (not shown) mounted on the knuckle N restrains the brake disk 3 of the rear wheel W. Therefore, a torque T (see FIG. 3) is applied to the knuckle N in a direction of rotation of the rear wheel W. As a result, a load U directed forwardly of the vehicle body is applied to a portion above the axle A supported on the knuckle N, i.e., to the outer ends of the upper arm UP and the leading arm LE, while a load L directed rearwardly of the vehicle body is applied to a portion below the axle A, i.e., to the outer ends of the lower arm LO and the trailing arm TR.

Figure 8A:
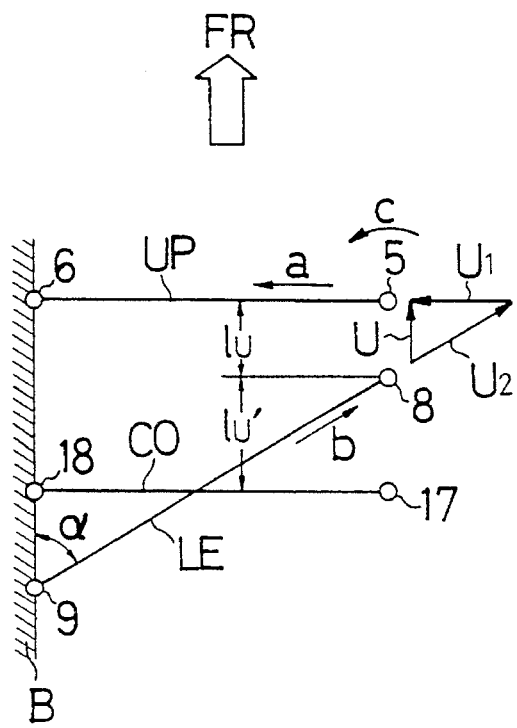

When the load U, FIG. 3, directed forwardly of the vehicle body, is applied to the outer ends of the upper arm UP and the leading arm LE, as shown in FIG. 8A, such load U is divided into a component of force $U_1$ directed toward the upper arm UP and a component of force $U_2$ directed outwardly from the leading arm LE, because the leading arm LE is inclined and the outer end of the upper arm UP is disposed in the vicinity of the outer end of the leading arm LE. The component of force $U_1$ compresses the upper arm UP in a direction indicated by an arrow a (FIG. 8A), and the component of force $U_2$ expands the leading arm LE in a direction indicated by an arrow b (FIG. 8A). As a result, the outer end of the upper arm UP is moved inwardly of the vehicle body, while at the same time, the outer end of the leading arm LE is drawn inwardly of the vehicle body while being swung forwardly of the vehicle body, so that a portion of knuckle N, above the axle A, is offset inwardly of the vehicle body. Little load, directed laterally of the vehicle body, is applied to the control arm CO, largely spaced apart rearwardly from the outer end of the leading arm LE, and for this reason, the outer end of the control arm CO is not offset. Therefore, the portion of the knuckle N above the axle A is swung in a direction indicated by an arrow c, FIG. 8A, about the outer end of the control arm CO (i.e., about the ball joint 17), thereby steering the rear wheel W in a toe-in direction.

Figure 8B:
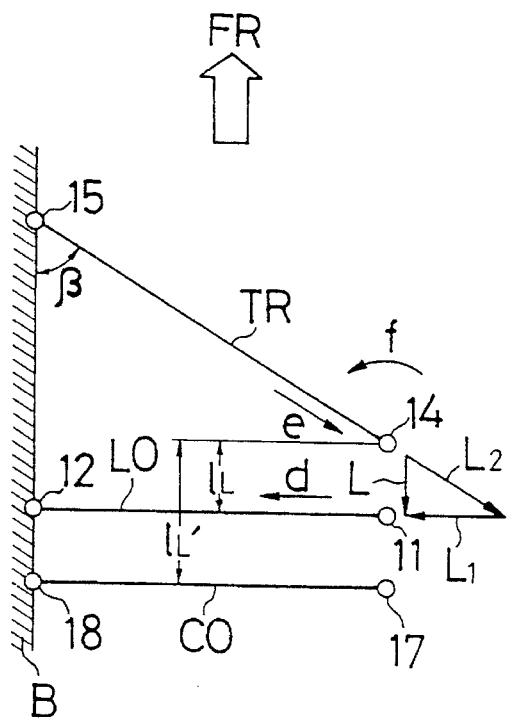

When load L, FIG. 3, directed rearwardly of the vehicle body, is applied to the outer ends of the lower arm LO and the trailing arm TR, as shown in FIG. 8B, such load L is divided into a component of force $L_1$ directed toward the lower arm LO and a component of force $L_2$ directed away from the trailing arm TR, because the trailing arm TR is inclined and the outer end of the lower arm LO is disposed in the vicinity of the outer end of the trailing arm TR. The component of force $L_1$ compresses the lower arm LO in a direction indicated by an arrow d, and the component of force $L_2$ expands the trailing arm TR in a direction indicated by an arrow e (FIG. 8B). As a result, the outer end of the lower arm LO is moved inwardly of the vehicle body, while at the same time, the outer end of the trailing arm TR is drawn outwardly of the vehicle body while being swung rearwardly of the vehicle body, so that a portion of the knuckle N, below the axle A, is offset inwardly of the vehicle body. Therefore, the portion of the knuckle N below the axle A is swung in a direction indicated by an arrow f (FIG. 8B) about the outer end (i.e., about the ball joint 17) of the control arm CO which is not offset laterally of the vehicle body, because it is largely spaced apart rearwardly from the outer end of the trailing arm TR. This steers the wheel W in the toe-in direction.

The larger the angle α (FIG. 8A), formed by the leading arm LE with the longitudinal direction of the vehicle body, the larger the component $U_1$ of the load U becomes. This makes it possible to largely offset the portion of the knuckle N above the axle A inwardly of the vehicle body to intensify the tendency of toe-in. Likewise, the larger the angle β (see FIG. 8B), formed by the trailing arm TR with the longitudinal direction of the vehicle body, the larger the component $L_1$ of the load L becomes. This makes it possible to largely offset the portion of the knuckle N below the axle A inwardly of the vehicle body to intensify the tendency of toe-in.

Any of the portions of the knuckle N above and below the axle A can be swung in the toe-in direction, so that the rear wheel W is toed-in with braking, thereby enhancing the steering stability.

The function of the above-described rubber bushing joints will be further described below in detail.

Figure 9A:
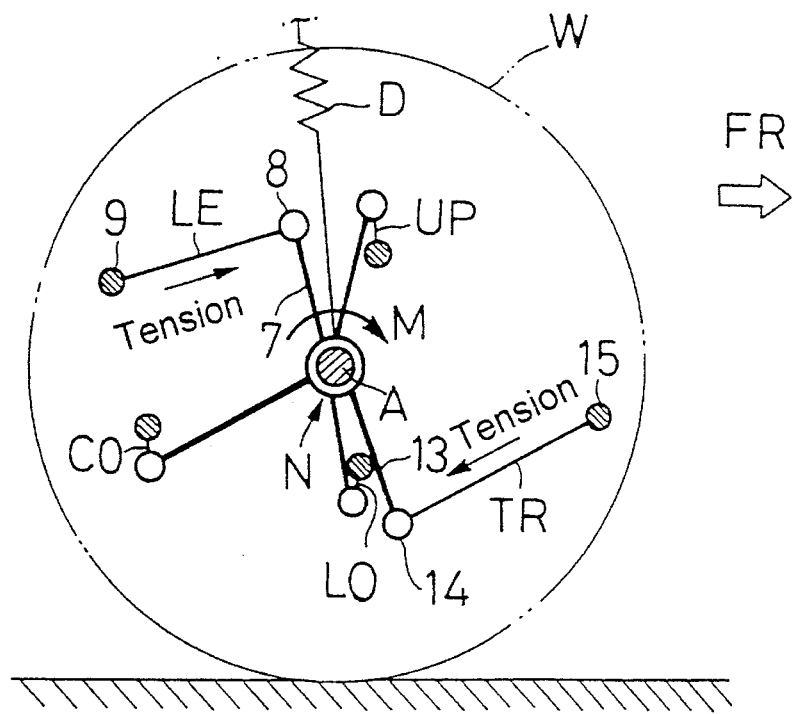

When a braking is conducted during traveling of the vehicle, the rear wheel W is unified (or integral) with the knuckle N by the brake caliper which is not shown, and hence, a moment indicated by an arrow M in FIG. 9A is applied to the knuckle N dragged by the rotation of the rear wheel W. As a result, a tension load is applied to both of the leading arm LE, extending rearwardly of the vehicle body from the upper portion of the knuckle N, and the trailing arm TR, extending forwardly of the vehicle body from the lower portion of the knuckle N.

As this time, the pair of rubber bushing joints 8 and 9, mounted at the opposite ends of the leading arm LE, have higher modulus of elasticity, thereby permitting only a smaller stroke, as described above. For this reason, even if the moment M is applied, the leading arm mounting portion 7 of the knuckle N is not moved forwardly of the vehicle body. In addition, a tension force is applied to the trailing arm TR, but because the rubber bushing joints 14 and 15 originally have a high modulus of elasticity, the trailing arm mounting portion 13 of the knuckle N is also hardly moved.

In this way, even if the moment M is applied to the knuckle N with braking, the knuckle is not turned by such moment M. Therefore, it is possible to provide a high caster rigidity to enhance the steering stability.

Figure 9B:
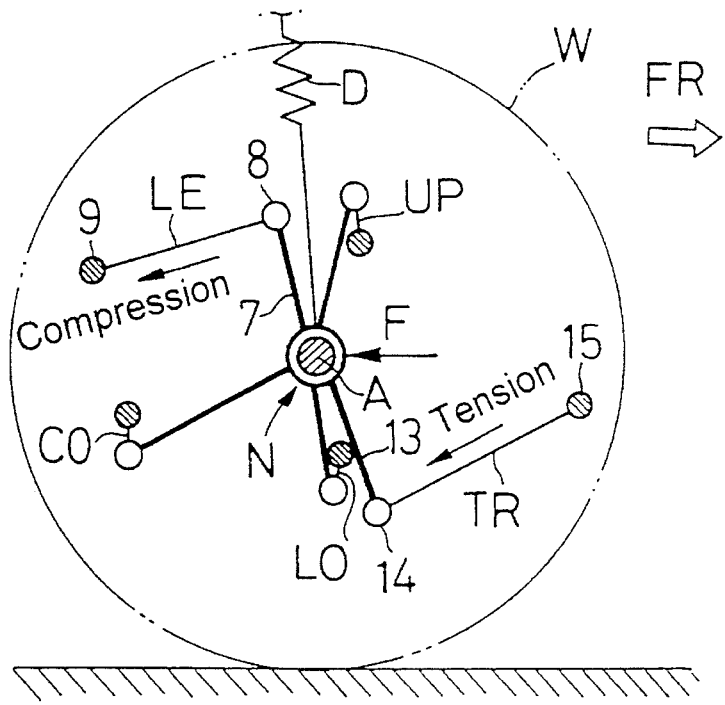

When the rear wheel W runs onto a stepped portion of a road surface or a small stone during traveling of the vehicle, the knuckle N is subjected to an upwardly directed load and a load directed rearwardly of the vehicle body. The upwardly directed load of these loads is absorbed by the expansion and contraction of the damper D. When the load (a longitudinal force F) directed rearwardly of the vehicle body is applied to the knuckle N, a compression load is applied to the leading arm LE, while a tension load is applied to the trailing arm TR, as shown in FIG. 9B.

At this time, the trailing arm mounting portion 13 of the knuckle N connected to the trailing arm TR is not moved rearwardly of the vehicle body. But the pair of rubber bushing joints 8 and 9, mounted at the opposite ends of the leading arm LE, have low modulus of elasticity, thereby permitting a larger stroke, as described above. This stroke enables the leading arm mounting portion 7 of the knuckle N to be moved rearwardly of the vehicle body.

Thus, when the rear wheel W runs a stepped portion of a road surface, or a small stone, the knuckle N can be escaped rearwardly of the vehicle body by the longitudinal force F applied to the knuckle N and hence, it is possible to provide a high longitudinal compliance to enhance the riding comfort performance.

It should be noted that when a load (a longitudinal force F) directed rearwardly of the vehicle body is applied to the knuckle N, due to a stepped portion of a road surface or the like, there is encountered a problem that if the damper D is expanded or contracted due to such load, a damping force is generated to lower the riding comfort. Therefore, when the longitudinal force F is applied to the knuckle N, it is desirable to prevent the expansion and contraction of the damper D as low as possible. In this embodiment, the expansion and contraction of the damper D is prevented in a manner which will be described below.

Figure 10:
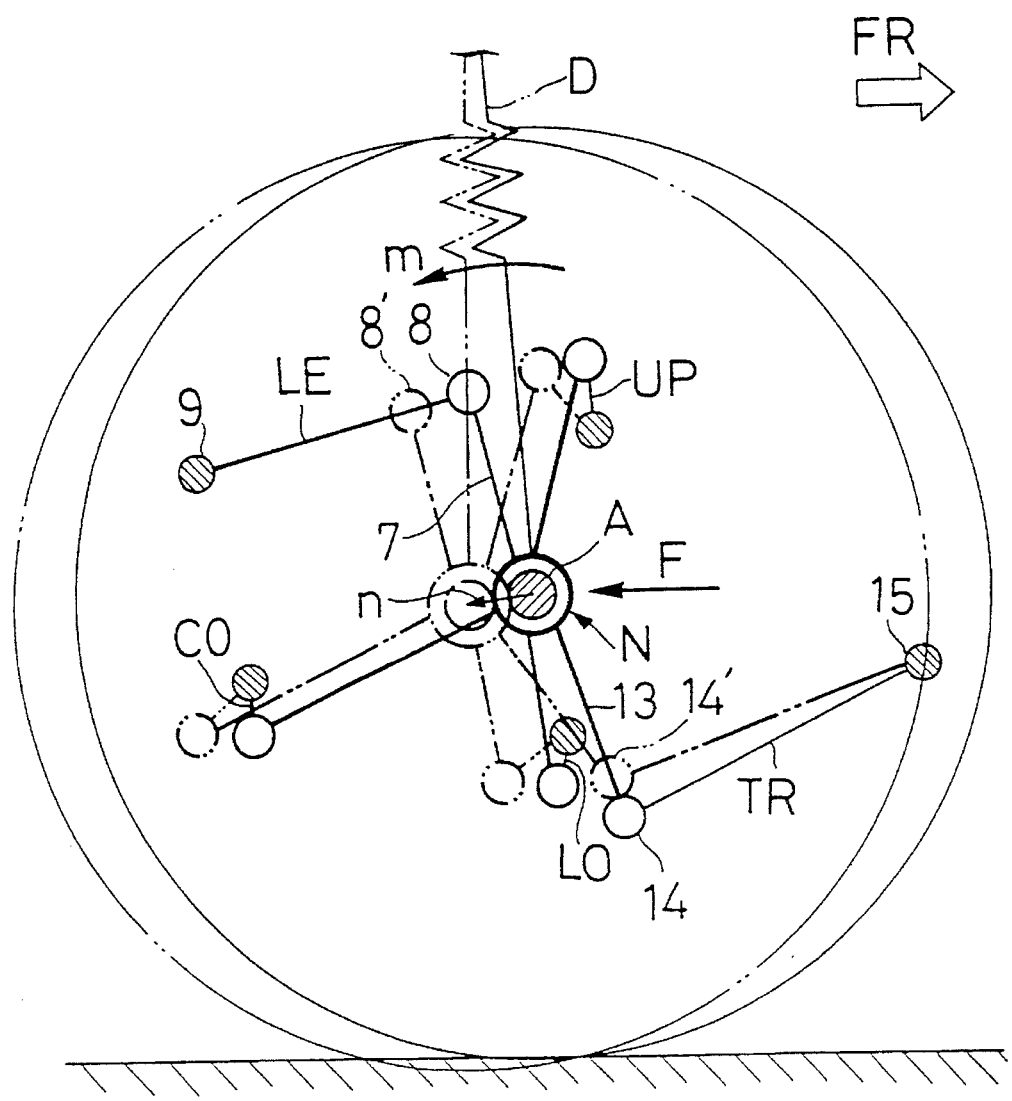

FIG. 10 illustrates a state in which a longitudinal force F has been applied to the knuckle N (i.e., the same state as in FIG. 9B). In FIG. 10, a black circle indicates a connection point of each arm to the vehicle body; a white circle indicates a connection point of each arm to the knuckle N; a solid line indicates each of positions of each arm, the axle A and the damper D before application of the longitudinal force F; and a dashed line indicates each of positions of each arm, the axle A and the damper D after application of the longitudinal force F.

As can be seen from FIG. 10, notwithstanding that the position of the rubber bushing joint 14 of the trailing arm TR, adjacent the knuckle, is little displaced (from 14 to 14') by the application of the longitudinal force F for the above-described reason, the position of the rubber bushing joint 8 of the leading arm LE adjacent the knuckle N is largely displaced rearwardly of the vehicle body (from 8 to 8'). As a result, the knuckle N is turned in a direction indicated by an arrow m, so that the position of the axle A is displaced in a direction indicated by an arrow n (i.e., downwardly and rearwardly of the vehicle body). At this time, even if the position of the axle A is displaced downwardly and rearwardly of the vehicle body, the length of the damper D is little varied, because the damper D is disposed with its upper portion inclined rearwardly of the vehicle body, as described above. This prevents the generation of a damping force due to an unnecessary expansion or contraction of the damper D, thereby reducing the vertical transmission force to enhance the riding comfort performance.

Figure 11A:
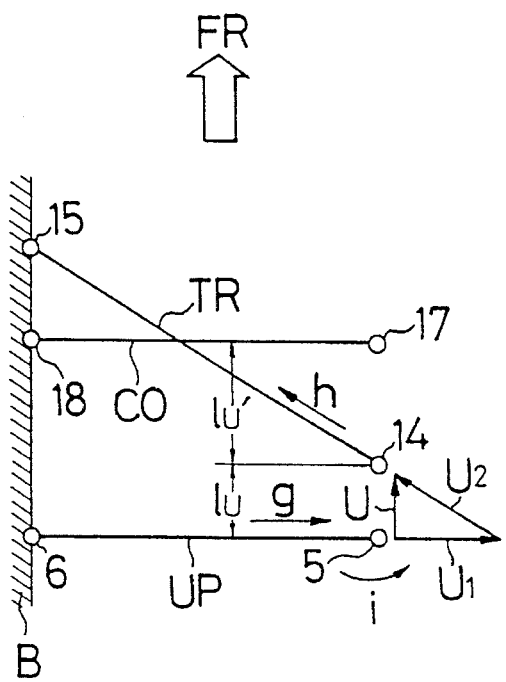
FIGS. 11A and 11B are diagrams similar to FIGS. 8A and 8B for explaining the operation according to a second embodiment.
Figure 11B:
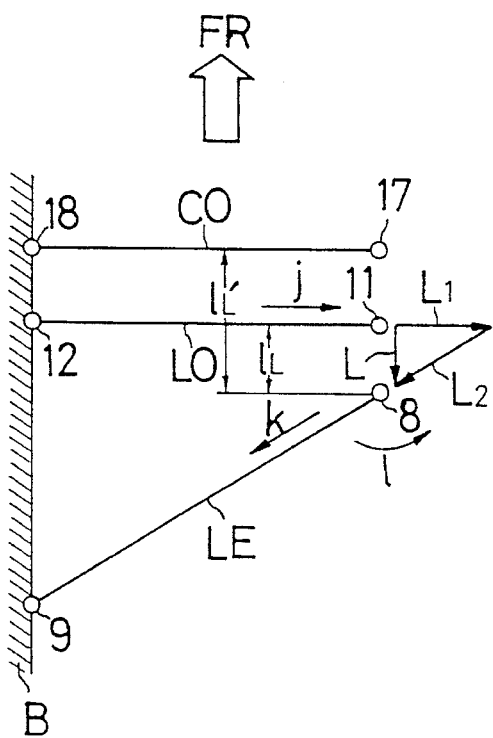
Figure 12:
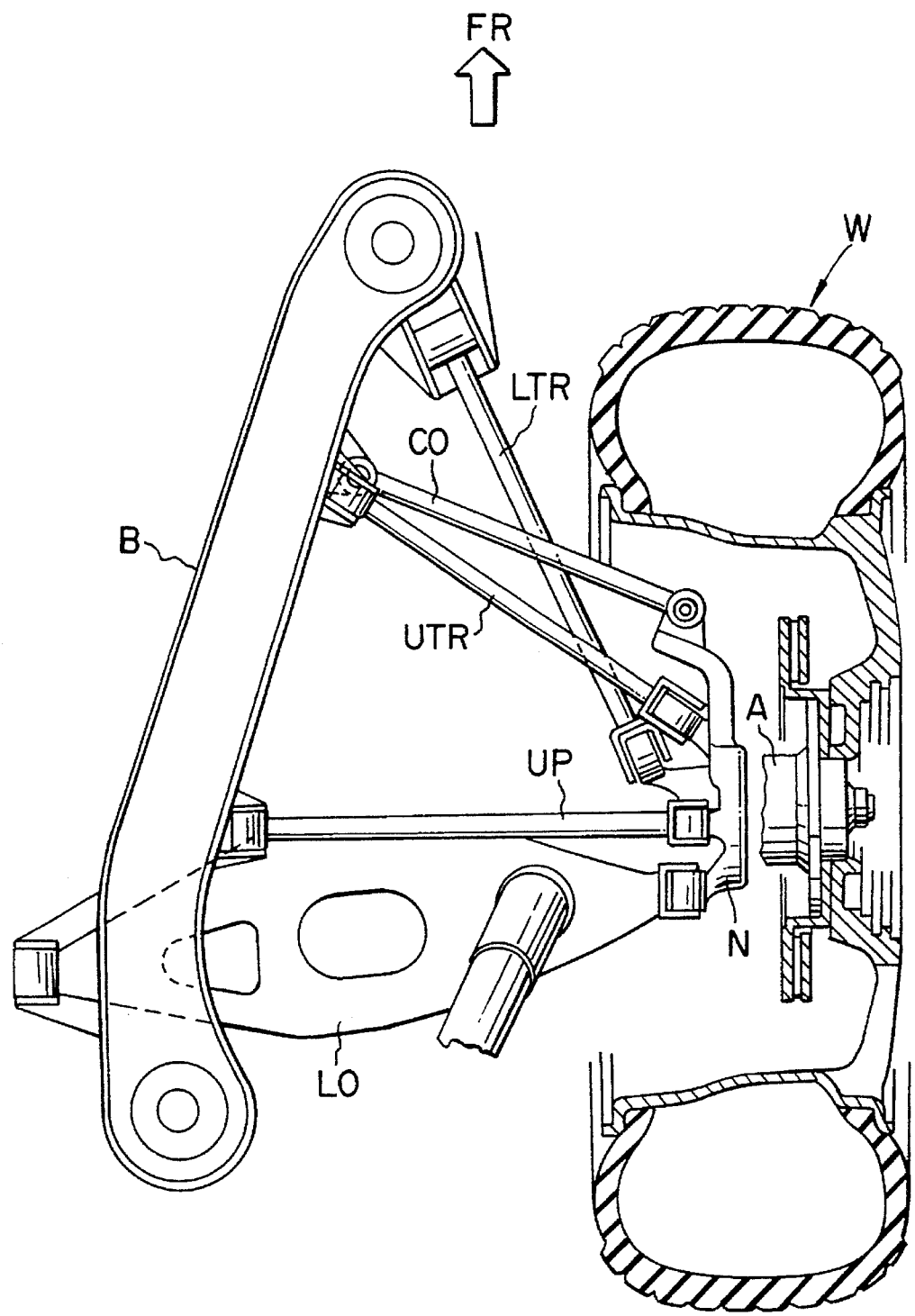
Figure 13A:
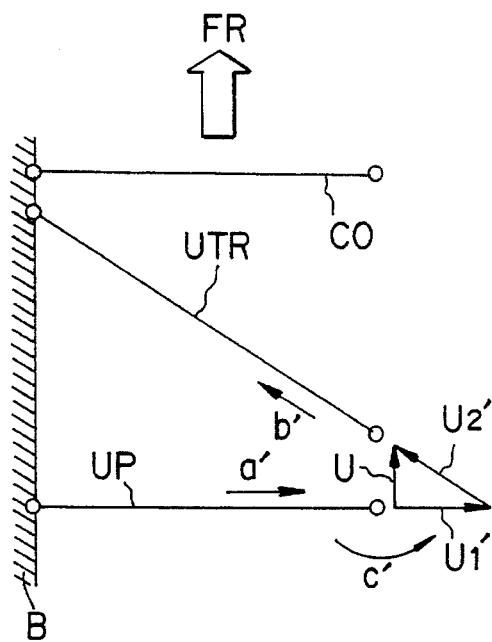
FIGS. 13A and 13B are diagrams similar to FIGS. 8A and 8B for explaining the operation of the prior art suspension system of FIGS. 12 and 13.
Figure 13B:
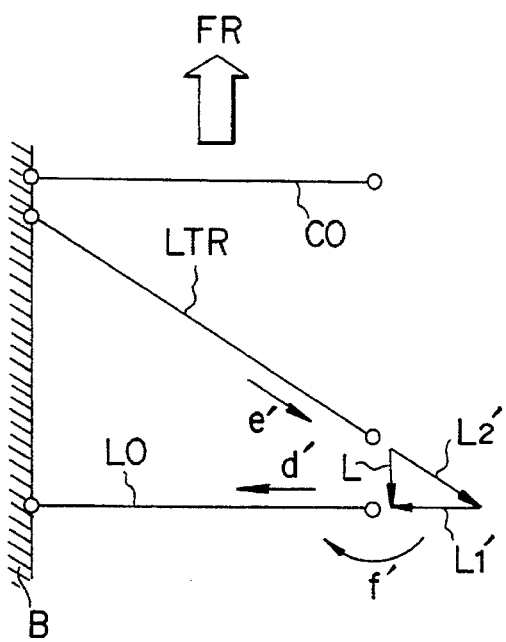

FIGS. 11A and 11B illustrate a second embodiment of a multi-link type suspension system according to the present invention.

In this embodiment, as shown in FIG. 11A, a portion of the knuckle N, above the axle A, is connected with the vehicle body B by an upper arm UP and a trailing arm TR. The rear-side upper arm UP extends laterally of the vehicle body, and the front-side trailing arm TR extends outwardly rearwardly of the vehicle body from a front inside of the vehicle body. A portion of the knuckle N, in front of the axle A, is connected with the vehicle body by a control arm CO. In addition, as shown in FIG. 11B, a portion of the knuckle N, below the axle A, is connected with the vehicle body by a lower arm LO and a leading arm LE. The front-side lower arm LO extends laterally of the vehicle body, and the rear-side trailing arm TR extends outwardly and forwardly of the vehicle body.

The longitudinal distance $l_U$, from an outer end of the control arm CO to an outer end of the trailing arm TR, is set larger than the longitudinal distance $l_U$ from an outer end of the upper arm UP to the outer end of the trailing arm TR. And the longitudinal distance $l_L$, from an outer end of the control arm CO to an outer end of the leading arm LE is set larger than the longitudinal distance $l_L$ from outer end of the lower arm LO to the outer end of the leading arm LE.

As shown in FIG. 11A, when a load U, directed forwardly of the vehicle body, is applied to the outer ends of the upper arm UP and the trailing arm TR by braking of the rear wheel W, a component $U_1$ of the load U expands the upper arm UP in a direction indicated by an arrow g, and a component $U_2$ compresses the trailing arm TR in a direction indicated by an arrow h. As a result, the outer end of the upper arm UP is moved outwardly of the vehicle body, and the outer end of the trailing arm TR is drawn outwardly of the vehicle body while being swung forwardly of the vehicle body, so that the upper portion of the knuckle N, above the axle A, is offset outwardly of the vehicle body. At this time, a load directed laterally of the vehicle body is not applied to the control arm CO largely spaced apart forwardly from the outer end of the trailing arm TR. Therefore, such outer end is not offset laterally of the vehicle body. As a result, the portion of the knuckle N, above the axle A, is swung in a direction indicated by an arrow i about the outer end of the control arm CO, thereby steering the rear wheel in a toe-in direction.

As shown in FIG. 11B, when a load L directed rearwardly of the vehicle body is applied to the outer ends of the lower arm LO and the leading arm LE during braking of the rear wheel W, a component $L_1$ of the load L expands the lower arm LO in a direction indicated by an arrow j, and a component $L_2$ compresses the leading arm LE in a direction indicated by an arrow k. As a result, the outer end of the lower arm LO is moved outwardly of the vehicle body, and the outer end of the leading arm LE is drawn outwardly of the vehicle body, while being swung rearwardly of the vehicle body, so that the portion of the knuckle N, below the axle A, is offset outwardly of the vehicle body. This causes the portion of the knuckle N below the axle A to be swung in a direction indicate by an arrow 1 about the outer end of the control arm CO which is not offset laterally of the vehicle body, because it is largely spaced apart forwardly from the outer end of the leading arm LE, thereby steering the rear wheel in the toe-in direction.

Both of the portions of the knuckle N above and below the axle A are swung in the toe-in direction, thereby achieving a toe-in of the rear wheel with braking.

Although the embodiments of the present invention have been described in detail, it will be understood that the present invention is not limited to these embodiments, and various modifications in design can be made without departing from the spirit and scope of the invention defined in claims.

For example, the vehicle body B to which an inner end of each suspension arm is connected may be any of a main frame or a sub-frame.

Although both the rubber bushing joints 8 and 9 at the opposite ends of the leading arm LE have the anisotropic rubber bushes 22 and 27, respectively, in the embodiment, only one of the rubber bushing joints 8 and 9 may have the anisotropic rubber bushing 22 or 27. Alternatively, one of the rubber bushing joints 8 and 9 may be a rubber bushing joint having an anisotropic rubber bush, and the other may be ball joint.

What is claimed is:

1. A multi-link type suspension system, comprising:

a knuckle for rotatably supporting an axle, five arms for connecting the knuckle to a vehicle body for vertical movement, and a damper for buffering the vertical movement of the knuckle, said five arms including an upper arm extending substantially parallel to the axle to connect the knuckle with the vehicle body above the axle, a leading arm extending outwardly and forwardly of the vehicle body from a rear inside position of the vehicle body to connect the knuckle with the vehicle body above the axle, a lower arm extending laterally of the vehicle body to connect the knuckle with the vehicle body below the axle, a trailing arm extending outwardly and rearwardly of the vehicle body from a front inside position of the vehicle body to connect the knuckle with the vehicle body below the axle, and a control arm extending laterally of the vehicle body to connect the knuckle with the vehicle body in a rear of the axle, a longitudinal distance from an outer end of the control arm to an outer end of the leading arm being set larger than a longitudinal distance from an outer end of the upper arm to the outer end of the leading arm, and a longitudinal distance from the outer end of the control arm to an outer end of the trailing arm being set larger than a longitudinal distance from an outer end of the lower arm to the outer end of the trailing arm wherein the system as arranged provides a toe-in to an associated wheel when a longitudinal load is applied to the outer ends of the upper and leading arms.

2. A multi-link type suspension system according to claim 1, further including a resilient bushing provided at least at one of a connection of the leading arm with the knuckle and a connection of the leading arm with the vehicle body, said resilient bushing having a modulus of elasticity which is high in a direction of tension of the leading arm and low in a direction of compression of the leading arm.

3. A multi-link type suspension system according to claim 2, wherein a supported point of the damper on the vehicle body is offset more rearwardly of the vehicle body than a supported point of the damper on the knuckle.

4. A multi-link suspension system, comprising;

a knuckle for rotatably supporting an axle, a first suspension mechanism including a pair of arms which support a longitudinal force of the knuckle above the axle and define an upper point of a king pin axis of a wheel, a second suspension mechanism including a pair of arms which support a longitudinal force of the knuckle below the axle and define a lower point of the king pin axis of the wheel, and a control arm extending laterally of the vehicle body to connect the vehicle body and the knuckle, said knuckle being provided with a mounting portion extending rearwardly from the knuckle to rotatably connect an outer end of said control arm in order to convert a longitudinal force applied to said first suspension mechanism and a longitudinal force applied to said second suspension mechanism into a force for offsetting the knuckle inwardly of the vehicle body during braking of the wheel, wherein said first suspension system includes an upper arm extending substantially parallel to the axle to connect the knuckle with the vehicle body above the axle, and a leading arm extending outwardly and forwardly of the vehicle body from a rear inside position of the vehicle body to connect the knuckle with the vehicle body above the axle to thereby provide a toe-in to an associated wheel when a longitudinal load is applied to the outer ends of the upper and leading arms, and wherein a resilient bushing is provided at least at one of a connection of the leading arm with the knuckle and a connection of the leading arm with the vehicle body, said resilient bushing having a modulus of elasticity which is high in a direction of tension of the leading arm and low in a direction of compression of the leading arm.

5. A multi-link type suspension system according to claim 4, wherein a supported point of said damper on the vehicle body is offset more rearwardly of the vehicle body than a supported point of the damper on the knuckle.

6. A multi-link type suspension system according to claim 4 wherein said second suspension mechanism comprises a lower arm extending laterally of the vehicle body to connect the knuckle with the vehicle body below the axle, and a trailing arm extending outwardly and rearwardly of the vehicle body from a front inside position of the vehicle body to connect the knuckle with the vehicle body below the axle.

7. A multi-link type suspension system according to claim 4, wherein said resilient bushings are provided at both of said connections of the leading arm.

8. A multi-link type suspension system according to claim 7, wherein said second suspension system includes a lower arm extending laterally of the vehicle body to connect the knuckle with the vehicle body below the axle, and a trailing arm extending outwardly and rearwardly of the vehicle body from a front inside position of the vehicle body to connect the knuckle with the vehicle body below the axle, resilient bushings being provided at connections of said trailing arm with the knuckle and with the vehicle body.

\* \* \* \* \*